(12) United States Patent
Kataoka et al.

(10) Patent No.: US 10,272,745 B2
(45) Date of Patent: Apr. 30, 2019

(54) HUMIDIFYING DEVICE FOR VEHICLE

(71) Applicant: DENSO CORPORATION, Kariya, Aichi-pref. (JP)

(72) Inventors: Takuya Kataoka, Kariya (JP); Manabu Maeda, Kariya (JP); Hitoshi Ninomiya, Kariya (JP); Yusuke Komatsubara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 121 days.

(21) Appl. No.: 15/508,188

(22) PCT Filed: Sep. 1, 2015

(86) PCT No.: PCT/JP2015/004441
§ 371 (c)(1),
(2) Date: Mar. 2, 2017

(87) PCT Pub. No.: WO2016/047051
PCT Pub. Date: Mar. 31, 2016

(65) Prior Publication Data
US 2017/0282690 A1 Oct. 5, 2017

(30) Foreign Application Priority Data
Sep. 22, 2014 (JP) ................. 2014-192747

(51) Int. Cl.
*B60H 3/02* (2006.01)
*B01F 3/04* (2006.01)
(Continued)

(52) U.S. Cl.
CPC ............... *B60H 3/022* (2013.01); *B01F 3/04* (2013.01); *B01F 3/04085* (2013.01);
(Continued)

(58) Field of Classification Search
CPC ............ B01F 3/04; B01F 3/04085; F24F 3/14
(Continued)

(56) References Cited

U.S. PATENT DOCUMENTS 5,873,256 A * 2/1999 Denniston .......... B60H 1/00414
62/244
2006/0270333 A1 11/2006 Hirai et al.
2010/0022177 A1 1/2010 Hidaka et al.

FOREIGN PATENT DOCUMENTS

JP 2008100566 A 5/2008
JP 2011093533 A 5/2011

* cited by examiner

*Primary Examiner* — Robert A Hopkins
(74) *Attorney, Agent, or Firm* — Harness, Dickey & Pierce, P.L.C.

(57) ABSTRACT

A humidifying device for a vehicle has a humidity detection part, a blower, a non-water-supply humidifier, and a controller. The humidity detection part detects a humidity in a vehicle compartment. The blower draws, as an intake air, an inside air in the vehicle compartment and an outside air outside the vehicle compartment at a specified ratio and blows the intake air toward the vehicle compartment. The non-water-supply humidifier collects water included in the inside air and supplies a humidified air, which is humidified using the water, toward a specified area in the vehicle compartment. The controller sets the specified ratio between the inside air and the outside air and controls an operation of the non-water-supply humidifier. The controller controls the blower to draw at least the inside air, when the non-water-supply humidifier is operated, and when a humidity in the vehicle compartment is lower than a specified humidity.

5 Claims, 3 Drawing Sheets

(51) Int. Cl.
*F24F 3/14* (2006.01)
*B60H 1/00* (2006.01)
*B60H 1/32* (2006.01)

(52) U.S. Cl.
CPC ..... *B60H 1/00785* (2013.01); *B60H 1/00849* (2013.01); *F24F 3/14* (2013.01); *B60H 2001/3245* (2013.01); *B60H 2003/026* (2013.01)

(58) Field of Classification Search
USPC .................................................. 261/26, 30
See application file for complete search history.

HUMIDIFYING DEVICE FOR VEHICLE

CROSS REFERENCE TO RELATED APPLICATIONS

This application is a U.S. National Phase Application under 35 U.S.C. 371 of International Application No. PCT/JP2015/004441 filed on Sep. 1, 2015 and published in Japanese as WO 2016/047051 A1 on Mar. 31, 2016. This application is based on and claims the benefit of priority from Japanese Patent Application No. 2014-192747 filed on Sep. 22, 2014. The entire disclosures of all of the above applications are incorporated herein by reference.

TECHNICAL FIELD

The present disclosure relates to a humidifying device for a vehicle that humidifies a vehicle compartment.

BACKGROUND ART

Patent Literature 1 discloses a humidifying and dehumidifying device that is a device humidifying or dehumidifying a vehicle compartment with water included in an inside air inside the vehicle compartment and without water supplied thereto. In the humidifying, an adsorbent adsorbs water included in the inside air, and a humidified air, which is humidified using the adsorbed water, is supplied to a passenger. In the dehumidifying, a dehumidified air, which is dehumidified by the adsorbent adsorbing the water, is used for defogging a window.

PRIOR ART LITERATURES

Patent Literature

Patent Literature 1: JP 2008-100566 A

SUMMARY OF INVENTION

The humidifying and dehumidifying device disclosed in Patent Literature 1 may cause the following abnormality when a humidity of the inside air is low. A humidity around the passenger is a humidity defined by adding a humidified value to an average humidity of the inside air. The adsorbent may not adsorb water sufficiently, and water desorbed therefrom may decrease, when the average humidity of the inside air is low. As a result, the humidified value also decreases. Accordingly, a humidifying around the passenger may not be performed sufficiently when the average humidity of the inside air is low.

The present disclosure addresses the above issues, and it is an objective of the present disclosure to provide a humidifying device for a vehicle that can improve an effect of a non-water-supply humidifying such that a comfortable humidity around a passenger is provided by increasing a humidity in a vehicle compartment, even when the humidity in the vehicle compartment is low.

A humidifying device for a vehicle has a humidity detection part, a blower, a non-water-supply humidifier, and a controller. The humidity detection part detects a humidity in a vehicle compartment. The blower draws, as an intake air, an inside air in the vehicle compartment and an outside air outside the vehicle compartment at a specified ratio and blows the intake air toward the vehicle compartment. The non-water-supply humidifier collects water included in the inside air and supplies a humidified air, which is humidified using the water, toward a specified area in the vehicle compartment. The controller sets the specified ratio between the inside air and the outside air drawn by the blower and controls an operation of the non-water-supply humidifier. The controller controls the blower to draw at least the inside air, when the non-water-supply humidifier is operated, and when a humidity in the vehicle compartment is lower than a specified humidity.

According to the present disclosure, the non-water-supply humidifier collects the water included in the inside air and supplies the humidified air, which is humidified using the water, toward a specified area in the vehicle compartment. As a result, the humidified air can be provided without supplying water in advance. Maintenance is easy since supply water is not necessary. However, the non-water-supply humidifier cannot collect the water sufficiently when the inside air includes a little water, i.e., the humidity in the vehicle compartment is low. Then, according to the present disclosure, the blower is controlled to draw at least the inside air when the humidity in the vehicle compartment is lower than the specified humidity. The inside air includes water from sweat or exhaled air of the passenger, therefore the humidity in the vehicle compartment rises gradually by taking in the inside air and blowing the inside air into the vehicle compartment again. As a result, the humidified air can be provided by circulating the inside air to secure the water even when the humidity is low. Thus, maintenance can be eased, and the specified area can be humidified by supplying the humidified air toward the specified area.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
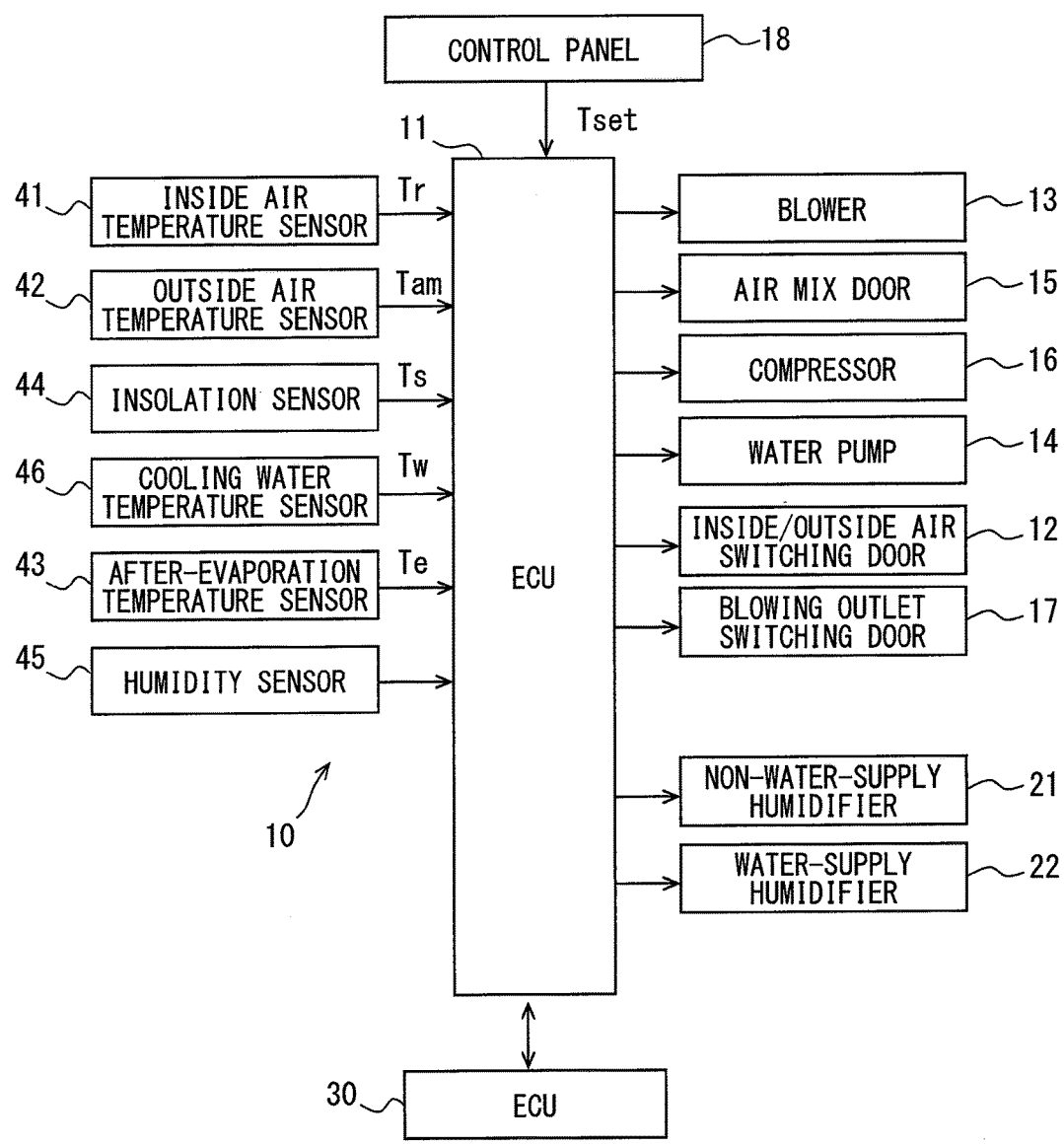
FIG. 1 is a block diagram showing an air conditioner 10 for a vehicle simply, according to a first embodiment.

Embodiments of the present disclosure will be described hereinafter referring to drawings. In the embodiments, a part that corresponds to a matter described in a preceding embodiment may be assigned with the same reference number, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment will be described referring to FIG. 1 through FIG. 4. An air conditioner 10 for a vehicle is used in a vehicle 100 such as a car in which a water-cooled engine for moving is mounted. The air conditioner 10 for a vehicle is a so-called automatic air conditioning system that is configured such that an air conditioning unit for air conditioning a vehicle compartment is controlled by an ECU 11 for the air conditioning.

An air conditioning unit 101 is an air conditioning unit that is capable of performing a temperature adjustment in a space of the vehicle compartment and setting a blowing outlet mode. The air conditioning unit 101 is arranged on a front side of the vehicle compartment of the vehicle 100 and has an air conditioning case through which air to be blown into the vehicle compartment flows. The air conditioning case is provided with an air inlet port on one side and with blowing outlets through which the air to be delivered to the vehicle compartment on the other side. The air conditioning case has an air passage through which the air to be blown into the vehicle compartment, and the air passage is located between the air inlet port and the blowing outlets. A blower unit is disposed on an upstream side (i.e., the one side) of the air conditioning case.

The blower unit is a blowing device and includes an inside/outside air switching door 12 and a blower 13. The inside/outside air switching door 12 is actuated by an actuator such as a servo motor and is a suction mode switching part that sets opening degrees of an inside air suction port and an outside air suction port, which are an air inlet port respectively. The inside/outside air switching door 12 adjusts a ratio between an inside air inside the vehicle compartment flowing through the inside air suction port and an outside air outside the vehicle compartment flowing through the outside air suction port by an angular displacement.

The blower 13 is a centrifugal blower that is rotary operated by a blower motor controlled by a blower operation circuit and that generates an air flow, which is delivered into the vehicle compartment, in the air conditioning case. The blower 13 changes a blowing volume of a conditioned air that is blown from the blowing outlets toward the space in the vehicle compartment.

An evaporator and a heater core are disposed in the air conditioning case as an air conditioning part that provides the conditioned air, which is supplied to the blowing outlets, by heating or cooling air blown from the blower unit. The evaporator is a cooling device that cools air flowing through the air conditioning case.

The heater core is disposed in a heating passage provided on a downstream side of the evaporator in a flow direction of air. The heater core is a heater that heats air passing therethrough by performing a heat exchange between the air and a cooling water for the engine moving the vehicle. A cooling water circuit in which the cooling water for engine moving the vehicle circulates is a circuit that circulates, using a water pump 14, the cooling water heated by a water jacket of the engine moving the vehicle. The cooling water circuit has a radiator, a thermostat, and the heater core. The cooling water after cooling the engine moving the vehicle flows in the heater core, and the heater core heats air, which passes through the heater core, using the cooling water as a heat source for a heating operation. The heater core is arranged in the air conditioning case on a downstream side of the evaporator to close the heating passage partially.

An air mix door 15 for performing a temperature adjustment in the vehicle compartment is disposed on an upstream side of the heater core in the flow direction of air. The air mix door 15 is operated by an actuator such as a servo motor and adjusts a blowing temperature of the conditioned air that is blown from the blowing outlets to an air conditioning target spaces in the vehicle compartment respectively. In other words, the air mix door 15 is an air mixing part that adjusts an air volume ratio between air passing through the evaporator and air passing through the heater core.

The evaporator is one of components configuring a refrigeration cycle. The refrigeration cycle includes a compressor 16, a condenser, a receiver, an expansion valve, and the evaporator. The compressor 16 is belt driven by an output shaft for the engine moving the vehicle mounted in an engine room of the vehicle 100. The compressor 16 compresses refrigerant and discharges the refrigerant. The condenser condenses the refrigerant discharged from the compressor 16 and liquefies the refrigerant. The receiver separates liquid refrigerant, which flows from the condenser into the receiver, into vapor refrigerant and liquid refrigerant. The expansion valve adiabatically expands the liquid refrigerant flowing from the receiver. The evaporator evaporates and vaporizes a gas-liquid two phase refrigerant flowing from the expansion valve. The condenser is arranged in a location in which the condenser easily receives traveling air that is caused when the vehicle is moving. The condenser is an exterior heat exchanger that performs a heat exchange between the refrigerant flowing in the condenser and the outside air blown by a cooling fan and between the refrigerant and the traveling air.

A defroster blowing outlet, a face blowing outlet, a foot blowing outlet communicate with the other side of the air conditioning case, i.e., with an area located on the downstream side of the air passage in the flow direction of air through blowing ducts respectively.

The defroster blowing outlet configures the blowing outlet for blowing the conditioned air toward a front windshield of the vehicle. The face blowing outlet configures the blowing outlet for blowing the conditioned air toward upper bodies (i.e., heads and chest regions) of a driver and a passenger having a passenger seat. The foot blowing outlet configures the blowing outlet for blowing the conditioned air toward foot of the driver and the passenger.

A defroster door, a face door, and a foot door are arranged in the air passage as blowing mode switching doors 17 that set blowing modes in the vehicle compartment. The blowing mode switching doors 17 is actuated by an actuator such as a servo motor and switches the blowing modes. The blowing modes are, for example, a face mode, a bi-level (B/L) mode, a foot mode, a foot/defroster mode, and a defroster mode.

Figure 2:
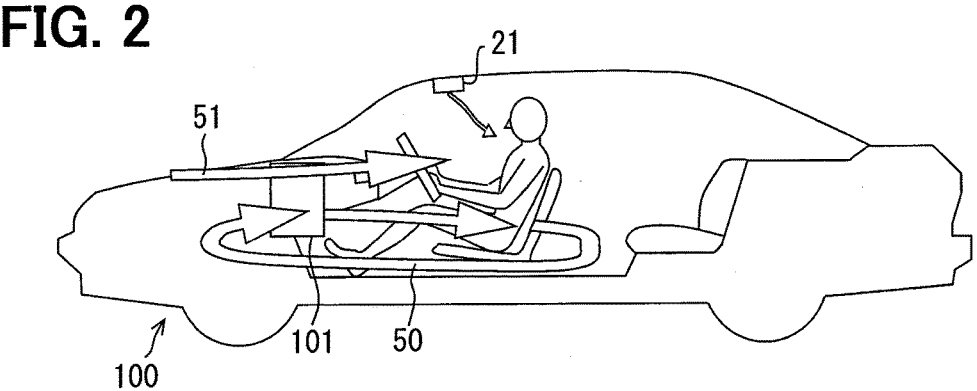
FIG. 2 is a side view illustrating the vehicle simply.

A non-water-supply humidifier 21 and a water-supply humidifier 22 are disposed in the vehicle compartment to adjust humidity in the vehicle compartment. The non-water-supply humidifier 21 is a non-water-supply humidifier that humidifies without a water supply. The non-water-supply humidifier 21 takes the inside air therein, absorbs water included in the inside air, generates high-humidity air by desorbing the water, and blows the high-humidity air toward a passenger. The non-water-supply humidifier 21 is disposed in a ceiling in the vehicle compartment as shown in FIG. 2, and supplies a humidified air toward a face of the passenger having a seat in the vehicle compartment. An ECU 11 controls an operation of the non-water-supply humidifier 21.

The water-supply humidifier 22 is provided separately from the non-water-supply humidifier 21 and is a humidifier such as a stand-alone humidifier that is portable and disposed in a cup holder etc. The water-supply humidifier 22 is a water-supply humidifier that humidifies air using water supplied thereto in advance. The water-supply humidifier 22 is, for example, a vaporizing type, a steam type or a water spray type and humidifies air. The ECU 11 controls an operation of the water-supply humidifier 22.

An electronic configuration of the air conditioner 10 for a vehicle will be described hereafter. The ECU 11 is a controller to which a direct-current power is supplied from a battery (not shown) that is an in-vehicle power source mounted in the vehicle 100 when an ignition switch, which controls the engine for moving to start or stopped, is turned on. The ECU 11 is configured to start an arithmetic processing or a control processing when electric power is supplied thereto. A communication signal output by an ECU 30 for the engine, switching signals from switches, which are provided on a control panel 18 disposed in a front surface in the vehicle compartment, and sensor signals from various sensors are input to the ECU 11.

The control panel 18 operated by the passenger will be described hereafter. The control panel 18 has, for example, a liquid crystal display, an inside/outside air setting switch, a defroster switch, a blowing mode setting switch, a blower air-volume setting switch, an air conditioning switch, an auto switch, an off switch, and a temperature setting switch. The liquid crystal display has, for example, a set temperature display portion that visibly displays a set temperature for a space to be air conditioned, a blowing mode display portion that visibly displays a blowing mode, and an air volume display portion that visibly displays a blower air-volume.

The control panel 18 will be described in connection with the various switches. A defroster switch corresponds to an air conditioning switch that orders whether to improve an antifogging performance suppressing a fogging of the front windshield. The defroster switch is a defroster mode request part that requests the blowing modes to be the defroster mode. The mode setting switch is a selecting part that requires the blowing modes to be one of the face mode, the bi-level (B/L) mode, the foot mode, and the foot/defroster mode depending on a manual operation by the passenger. The air conditioning switch is an air conditioning operation switch that orders to start or stop an operation of the compressor 16 of the refrigeration cycle. The temperature setting switch is a temperature setting part for setting a temperature in the vehicle compartment to be a required temperature (Tset).

A common microcomputer that includes a CPU (central arithmetic unit) performing an arithmetic processing and a control processing, memories such as ROM and RAM, and an I/O port (an input/output circuit), etc. is provided in the ECU 11. Sensor signals from the various sensors are input to the microcomputer after being A/D converted in the I/O port or an A/D conversion circuit. As shown in FIG. 1, the ECU 11 is connected to an inside/outside air temperature sensor 41 and an outside air temperature sensor 42. The inside/outside air temperature sensor 41 is an inside/outside air temperature detector that detects an air temperature (i.e., an inside air temperature) Tr around a driver seat. The outside air temperature sensor 42 is an outside air temperature detector that detects a temperature (i.e., an outside air temperature) outside the vehicle compartment. The ECU 11 is also connected to an after-evaporation temperature sensor 43 and an insolation sensor 44. The after-evaporation temperature sensor 43 is an after-evaporation temperature detector that detects a temperature (i.e., an after-evaporation temperature TE) of air immediately after passing through the evaporator. The insolation sensor 44 detects an insolation penetrating into the vehicle compartment. The ECU 11 is connected to a humidity sensor 45 and a cooling water temperature sensor 46. The humidity sensor 45 is a humidity detector that detects a relative humidity in the vehicle compartment. The cooling water temperature sensor 46 detects a temperature of engine cooling water.

A thermo-sensitive element such as a thermistor is used as the inside/outside air temperature sensor 41, the outside air temperature sensor 42, the after-evaporation temperature sensor 43, and the cooling water temperature sensor 46. The inside air temperature sensor 41 is located around the driver seat, e.g., in an area that is hardly affected when the blowing outlets other than the blowing outlets for the driver seat, which are provided around a steering wheel on an inner side of the instrument panel, are closed. The humidity sensor 45 is located in the front windshield to detect a humidity in the vehicle compartment and a fogging of the front windshield. The humidity sensor 45 is, e.g., a variable capacitance capacitor of which capacitance varies depending on the relative humidity of air. The humidity sensor 45 has a thermistor for detecting a window surface temperature of the front windshield inside the vehicle compartment and a temperature of air around the humidity sensor 45. The ECU 11 calculates a relative humidity of the window surface of the windshield using the humidity, the temperature of the air, and the window surface temperature. The insolation sensor 44 is, e.g., a photodiode for detecting an insolation amount penetrating into a space to be air conditioned.

A control for a normal air conditioning inside the vehicle compartment performed by the ECU 11 will be described hereafter. The ECU 11 performs a control program pre-stored in the memories when the ignition switch is turned on and when the direct current power is supplied to the ECU 11. The ECU 11 calculates a target blowing temperature TAO using data from the various sensors and calculates a target after-evaporation temperature TEO using the target blowing temperature TAO and the outside air temperature Tam. The ECU 11 determines a blower air volume, an opening degree of the air mix door 15, a suction mode, and a blowing mode to controls various devices.

Figure 3:
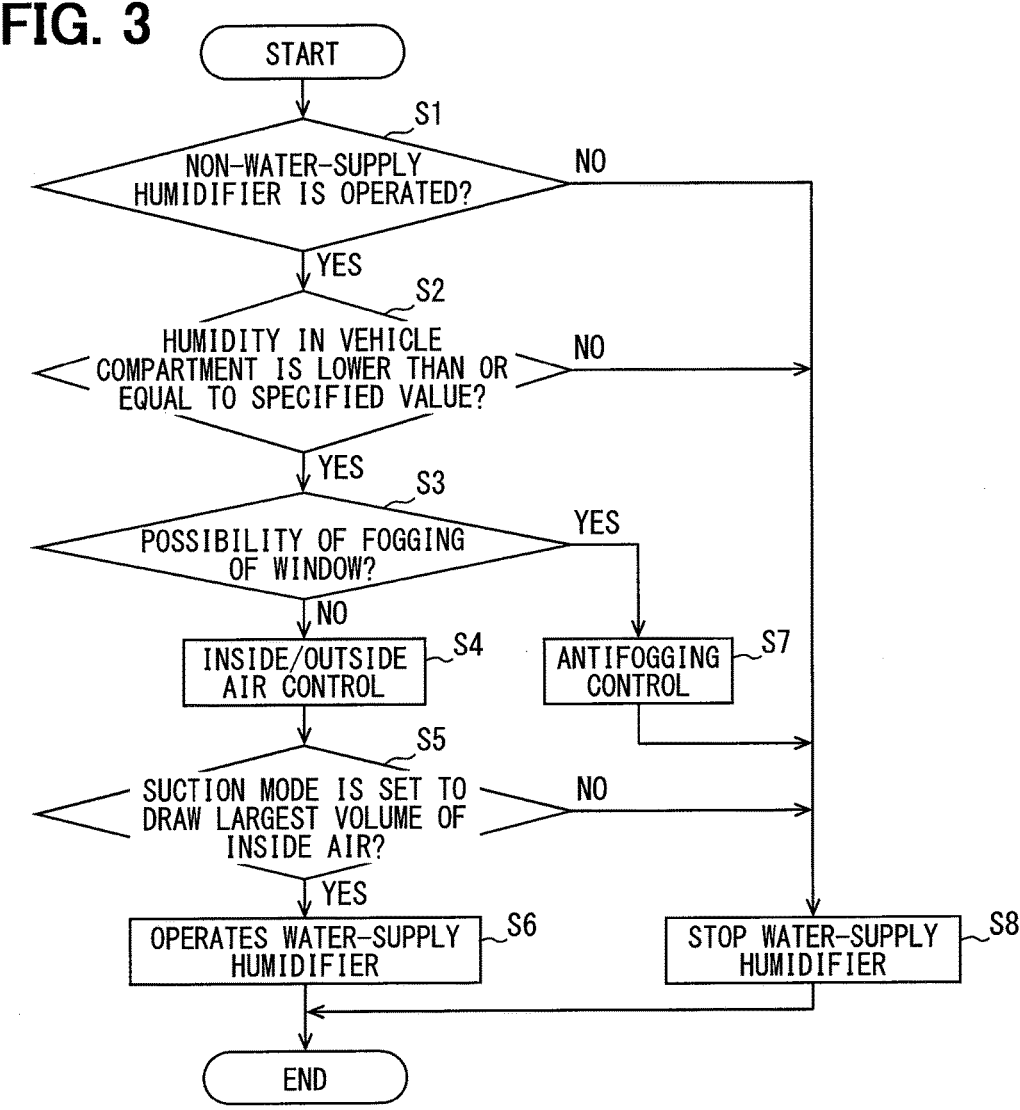
FIG. 3 is a flowchart showing a humidity control.

A humidity control inside the vehicle compartment performed by the ECU 11 will be described referring to FIG. 3 and FIG. 4. The control flow is repeatedly performed in a short time on a condition that power is supplied to the ECU 11.

The non-water-supply humidifier 21 is determined whether to be operated or not at S1. The control flow advances to S2 when the non-water-supply humidifier 21 is operated, and advances to S8 when the non-water-supply humidifier 21 is not operated.

The humidity inside the vehicle compartment is determined whether to be lower than or equal to a specified value at S2. The control flow advances to S3 when the humidity inside the vehicle compartment is lower than or equal to the specified value, and advances to S8 when the humidity inside the vehicle compartment is not lower than or equal to the present value. The non-water-supply humidifier 21 is operated at S2, however a humidifying performance deteriorates only with an operation of the non-water-supply humidifier 21 when the humidity inside the vehicle compartment is low and lower than or equal to the present value. Then, the following control for increasing the humidity inside the vehicle compartment is performed when the humidity inside the vehicle compartment is lower than or equal to the specified value.

A possibility of a fogging of a window is determined whether to be present or not at S3. The control flow advances to S7 when the possibility of the fogging of the window is present, and advances to S4 when the possibility of the fogging of the window is not present. The possibility of the fogging of the window is determined based on the relative humidity of the window surface. The relative humidity around the window, i.e., the relative humidity on the window surface is set to be a highest humidity that does not cause the fogging. A level around the highest humidity is, e.g., 80%.

Accordingly, the possibility of the fogging of the window is determined to be present when the relative humidity is higher than or equal to 80%.

The inside/outside air control is performed at S4 since the possibility of the fogging of the window is not present, and the control flow advances to S5. The inside/outside air control is a control to draw at least an inside air 50 and circulates the inside air 50 by blowing the inside air 50 into the vehicle compartment. Accordingly, humidity inside the vehicle compartment rises due to exhaled air and sweat of the passenger. In addition, the possibility of the fogging of the window is low when the humidity rises since the possibility of the fogging of the window is not present. In the inside/outside air control, a ratio of the inside air 50 is controls depending on a degree of the possibility of the fogging of the window, and an outside air 51 increases when the possibility of the fogging of the window is high. In other words, a suction ratio between the inside air 50 and the outside air 51 is controlled through multiple stages depending on the degree of the possibility of the fogging of the window in the inside/outside air control.

An antifogging control is performed at S7 since the possibility of fogging of the window is present, and the control flow advances to S8. The antifogging control sets an outside mode, in which only the outside air 51 is drawn, as the suction mode, sets the defroster mode, in which the defroster blowing outlet is open, as the blowing mode, and decreases the relative humidity around the window to remove the fogging of the window.

The suction mode is determined, at S5, whether to be a mode in which the suction ratio controlled at S4 is a ratio drawing a largest volume of the inside air among the multiple stages. The control flow advances to S6 when the suction mode is the mode, and advances to S8 when the suction mode is not the mode.

The water-supply humidifier 22 is controlled to be operated at S8, and the control flow is completed. The humidity is assumed not to be increased enough by increasing a volume of the inside air since the humidity inside the vehicle compartment is primarily low, when the suction mode is the mode in which the suction ratio of the inside air is the largest among the multiple stages. Accordingly, the humidity inside the vehicle compartment is increased by operating the water-supply humidifier 22.

An operation of the water-supply humidifier 22 is stopped at S8, and the control flow is completed. For example, the operation of the water-supply humidifier 22 is stopped when the non-water-supply humidifier 22 is not operated. Thus, the non-water-supply humidifier 22 is operated preferentially. The operation of the water-supply humidifier 22 is stopped when the non-water-supply humidifier 21 is operated and when the humidity inside the vehicle compartment is higher than the specified value. The reason is that the non-water-supply humidifier 21 can humidify sufficiently. The operation of the water-supply humidifier 22 is stopped to decrease the humidity when the antifogging control is performed. The humidity can be sufficiently increased only with water from the passenger when the suction mode is the mode in which the suction ratio controlled at S4 is the ratio drawing the largest volume of the inside air among the multiple stages. The operation of the water-supply humidifier 22 is thereby stopped.

As described above, the humidity inside the vehicle compartment is increased by increasing a circulation volume of the inside air in a case that the humidity inside the vehicle compartment is primarily low and that the humidifying performance is low even when the non-water-supply humidifier 21 is operated. In a case that the humidifying performance is still insufficient, the water-supply humidifier 22 is operated to increase the humidity.

Figure 4:
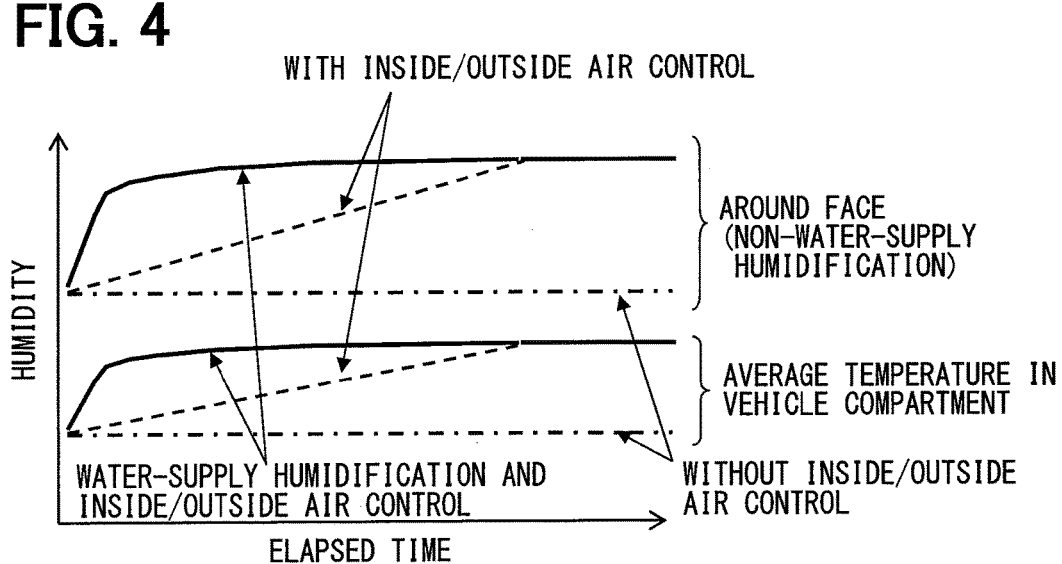
FIG. 4 is a graph explaining the humidity control.

In FIG. 4, a one-dot line shows a humidity according to a comparative example in which the inside/outside air control is not performed, a dashed line shows a humidity when performing the inside/outside air control as in the present embodiment, and a solid line shows a humidity when performing the control of the water-supply humidifier 22. As shown in FIG. 4, humidity around a face of the passenger when performing the inside/outside air control is obviously higher as compared to a case not performing the inside/outside air control.

As described above, the air conditioner 10 for a vehicle according to the present embodiment has the non-water-supply humidifier 21 and the water-supply humidifier 22 and functions as a humidifying device for a vehicle that humidifies an inside of the vehicle compartment. The non-water-supply humidifier 21 collects water included in air inside the vehicle compartment and supplies a humidified air, which is humidified using the water, toward a specified area. That is, the humidified air can be generated without supplying water in advance. As a result, maintenance can be easy since water supply is not necessary. The non-water-supply humidifier 21 however cannot collect water sufficiently when water included in the air inside the vehicle compartment is small, i.e., when humidity inside the vehicle compartment is low. Then, the suction mode is controlled to draw at least the inside air inside the vehicle compartment when the humidity inside the vehicle compartment is lower than a specified humidity (i.e., the specified value). The inside air inside the vehicle compartment includes water, which is included in exhaled air and sweat of the passenger, and thereby the humidity inside the vehicle compartment rises gradually by drawing the inside air and supplying the inside air again into the vehicle compartment. As a result, the water can be secured by circulating the inside air, and the humidified air can be generated, even when the humidity is low. Thus, the maintenance can be easy, and the specified area can be humidified by supplying the humidified air to the specified area.

According to the present embodiment, the ECU 11 has a determination section (S3) that determines whether the possibility of the fogging of the window is present or not using the detected relative humidity of the window surface. The ECU 11 thereby functions as the determination section. The ECU 11 controls the air conditioning unit 101 to draw at least the inside air until the possibility of the fogging of the window is determined to be present when the non-water-supply humidifier 21 is operated and when the humidity inside the vehicle compartment is lower than the specified humidity. As a result, an excess increase of the humidity due to an increase of the circulation volume of the inside air is suppressed, and thereby the fogging of the window can be prevented from causing.

In addition, according to the present embodiment, the ECU 11 controls the air conditioning unit to draw at least the inside air and operates the water-supply humidifier 22 when the non-water-supply humidifier 21 is operated and when humidity inside the vehicle compartment is lower than the specified humidity. As a result, the specified are can be humidified quickly by a humidifying performance of the water-supply humidifier 22 as compared to a case that only the circulation volume of the inside air is increased.

The air conditioner 10 for a vehicle of the present embodiment interlocks the non-water-supply humidifier 21 with the inside/outside air control, or interlocks the non-water-supply humidifier 21, the inside/outside air control, and the water-supply humidifier 22 together, and thereby can increase an average humidity inside the vehicle compartment. As a result, humidity around the passenger rises, and a comfortable humidity environment can be provided.

According to the present embodiment, the non-water-supply humidifier 21 supplies the humidified air toward a face of the passenger having a seat inside the vehicle compartment. The non-water-supply humidifier 21 humidifies the specified area intensively, and thereby an area that the passenger requires to humidify can be humidified effectively.

According to the present embodiment, the non-water-supply humidifier 21 and the water-supply humidifier 22 are configured separately. The non-water-supply humidifier 21 humidifies locally, and the water-supply humidifier 22, in contrast, humidifies an entirety of the inside of the vehicle compartment. That is, the non-water-supply humidifier 21 and the water-supply humidifier 22 have different target areas to be humidified. Therefore, a size of the non-water-supply humidifier 21 is preferably small to be disposed around the seat inside the vehicle compartment, and the non-water-supply humidifier 21 can be downsized by being provided separately from the water-supply humidifier 22.

In other words, the air conditioner 10 for a vehicle increases the circulation volume of the inside air when the humidity is lower than the specified value and when the possibility of the fogging of the window is low. Accordingly, water emitted from the exhaled air and sweat of the passenger into the inside air inside the vehicle compartment is kept in the vehicle compartment, and the average humidity inside the vehicle compartment can be increased by the water. The inside of the vehicle compartment is sufficiently humidified when the possibility of the fogging of the window is not present and when the ratio of the inside air 50 is the largest in the inside/outside air control for the air conditioning. However, the water-supply humidifier 22 is operated such that a humidifying speed increases and that the humidity quickly reaches a highest humidity, which is highest within a range in which the fogging of the window does not occur. A water supply may be too much work, or supplied water may be rotten, when the water-supply humidifier 22 is built in the vehicle 100. Thus, the water-supply humidifier 22 is provided as a separate humidifier. A wireless communication is preferably used for controlling the separated humidifier.

Second Embodiment

A second embodiment will be described hereafter referring to FIG. 5. According to the present embodiment, the water-supply humidifier 22 is not disposed, and the humidity is controlled only by the non-water-supply humidifier 21.

Figure 5:
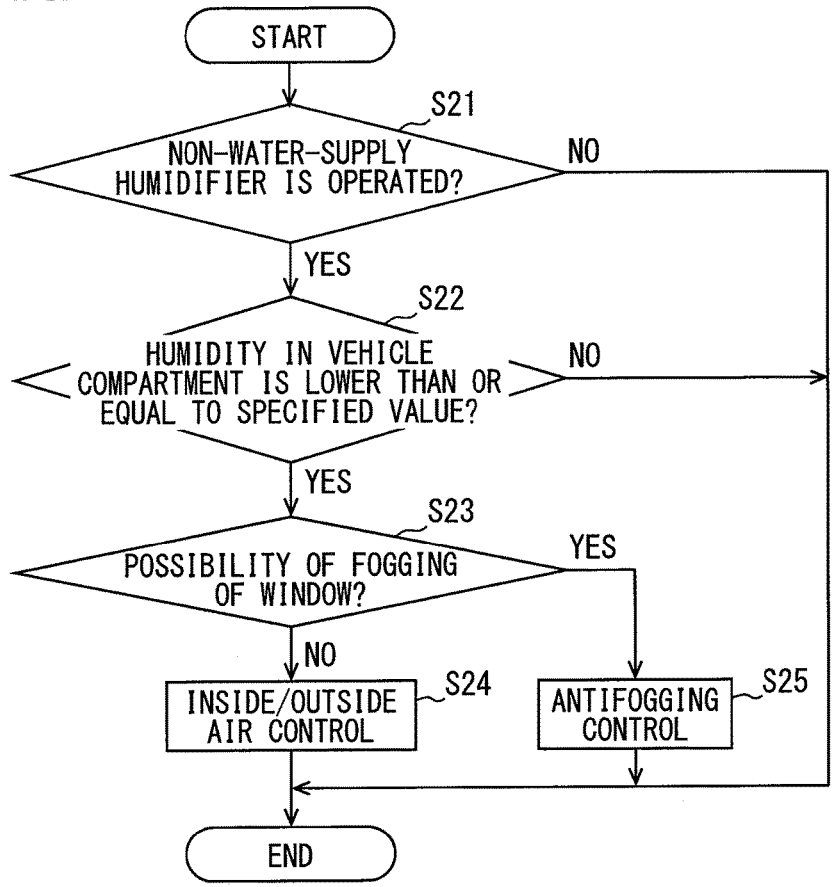
FIG. 5 is a flowchart showing a humidity control according to a second embodiment.

A control flow shown in FIG. 5 is repeated in a short time while electric power is supplied to the ECU 11. The non-water-supply humidifier 21 is determined whether to be operated or not at S21. The control flow advances to S22 when the non-water-supply humidifier 21 is operated, and is completed when the non-water-supply humidifier 21 is not operated.

Humidity inside the vehicle compartment is determined whether to be lower than or equal to the specified value at S22. The control flow advances to S23 when the humidity inside the vehicle compartment is lower than or equal to the specified value, and is completed when the humidity inside the vehicle compartment is not lower than or equal to the specified value.

The possibility of the fogging of the window is determined whether to be present or not at S23. The control flow advances to S25 when the possibility of the fogging of the window is present, and advances to S24 when the possibility of the fogging of the window is not present. The inside/outside air control is performed S24 since the possibility of the fogging of the window is not present, and the control flow is completed. The antifogging control is performed at S25 since the possibility of the fogging of the window is present, and the control flow is completed.

As described above, the circulation volume of the inside air is increased to increase humidity inside the vehicle compartment in a case that humidity inside the vehicle is primarily low and that the humidifying performance is low even when the non-water-supply humidifier 21 is operated. Accordingly, as shown in FIG. 4, humidity around a face of the passenger when performing the inside/outside air control is obviously higher as compared to a case that the inside/outside air control is not performed. In addition, maintenance is unnecessary since the water-supply humidifier 22 is not used.

Other Modifications

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure.

It should be understood that structures described in the above-described embodiments are preferred structures, and the present disclosure is not limited to have the preferred structures. The present disclosure is intended to cover various modifications and equivalent arrangements within the scope of the present disclosure.

The suction ratio between the inside air 50 and the outside air 51 is set with multiple stages according to the above-described embodiment. However, the suction ratio may be changed continuously or may be two modes of a mode drawing the inside air 50 and a mode drawing the outside air 51.

The water-supply humidifier 22 is a stand-alone type and placed in the cup holder according to the above-described embodiment, however may be placed in another location. For example, the water-supply humidifier 22 may be disposed inside the air conditioning unit 101, or may be disposed in a blowing duct.

The water-supply humidifier 22 and the ECU 11 communicate with each other using the wireless communication according to the above-described first embodiment, however may communicate with each other using a wired communication. The water-supply humidifier 22 is not limited to be controlled by the ECU 11, and may be controlled autonomously depending on humidity by communicating with the humidity sensor 45 on a normal condition.

The non-water-supply humidifier 21 is disposed in the ceiling inside the vehicle compartment according to the above-described first embodiment. However, the non-water-supply humidifier 21 may be disposed in another location such as a seat, a door, or an instrument panel.

What is claimed is:
1. A humidifying device for a vehicle, comprising:
a humidity detection part that detects a humidity in a vehicle compartment;
a blower that draws, as an intake air, an inside air inside the vehicle compartment and an outside air outside the vehicle compartment at a specified ratio and blows the intake air toward the vehicle compartment;

a non-water-supply humidifier configured to draw in the inside air and collect water from the inside air, wherein the non-water supply humidifier absorbs and desorbs water included in the inside air, humidifies the inside air using the collected water, and supplies the humidified air toward a specified area in the vehicle compartment; and a controller that sets the specified ratio between the inside air and the outside air drawn by the blower and controls an operation of the non-water-supply humidifier, wherein the controller controls the blower to draw at least the inside air, when the non-water-supply humidifier is operated, and when a humidity in the vehicle compartment is lower than a specified humidity.

2. The humidifying device for a vehicle according to claim 1, further comprising a determination section that determines whether a possibility of a fogging of a window is present using the humidity detected by the humidity detection part, wherein the controller controls the blower to draw at least the inside air until the determination section determines the possibility of the fogging of the window is present, when the non-water-supply humidifier is operated, and when the humidity in the vehicle compartment is lower than the specified humidity.

3. The humidifying device for a vehicle according to claim 1, further comprising a water-supply humidifier that humidifies the vehicle compartment using water supplied to the water-supply humidifier in advance, wherein the controller controls the blower to draw at least the inside air and controls the water-supply humidifier to operate, when the non-water-supply humidifier is operated, and when the humidity in the vehicle compartment is lower than the specified humidity.

4. The humidifying device for a vehicle according to claim 1, wherein the non-water-supply humidifier supplies the humidified air toward a face of a passenger having a seat in the vehicle compartment.

5. The humidifying device for a vehicle according to claim 3, wherein the non-water-supply humidifier and the water-supply humidifier are provided separately from each other.

* * * * *